US008896906B2

(12) United States Patent
Zhou et al.

(10) Patent No.: US 8,896,906 B2
(45) Date of Patent: Nov. 25, 2014

(54) INKS INCLUDING BLOCK COPOLYMER GRAFTED PIGMENTS VIA AZIDE CHEMISTRY

(75) Inventors: Zhang-Lin Zhou, Palo Alto, CA (US); Qin Liu, Corvallis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 490 days.

(21) Appl. No.: 13/115,754

(22) Filed: May 25, 2011

(65) Prior Publication Data

US 2012/0300284 A1 Nov. 29, 2012

(51) Int. Cl.

| | | |
|---|---|---|
| *G02B 26/00* | (2006.01) | |
| *G02B 26/08* | (2006.01) | |
| *G02F 1/29* | (2006.01) | |
| *A61K 9/16* | (2006.01) | |
| *A61K 9/50* | (2006.01) | |
| *G02B 5/22* | (2006.01) | |
| *C09D 11/36* | (2014.01) | |
| *C09D 11/037* | (2014.01) | |
| *G02B 5/20* | (2006.01) | |
| *C09D 11/322* | (2014.01) | |
| *C09D 11/033* | (2014.01) | |
| *C08K 9/08* | (2006.01) | |
| *G02F 1/167* | (2006.01) | |

(52) U.S. Cl.
CPC ............ *C09D 11/322* (2013.01); *G02B 26/004* (2013.01); *C08K 9/08* (2013.01); *G02B 5/223* (2013.01); *C09D 11/36* (2013.01); *C09D 11/037* (2013.01); *G02B 5/201* (2013.01); *G02F 2001/1678* (2013.01); *C09D 11/033* (2013.01)
USPC ........................... 359/296; 359/298; 424/490

(58) Field of Classification Search
USPC ........................ 359/290–292, 295–296, 298; 424/489–491, 46; 106/31.33, 31.65, 106/604
See application file for complete search history.

(56) References Cited

U.S. PATENT DOCUMENTS

| | | | | |
|---|---|---|---|---|
| 8,048,526 B2 * | 11/2011 | Mizrahi | ........................ | 428/407 |
| 2010/0245981 A1 | 9/2010 | Yeo et al. | | |
| 2011/0043441 A1 | 2/2011 | Tokunaga et al. | | |
| 2012/0275012 A1 * | 11/2012 | Zhou et al. | .................... | 359/296 |

FOREIGN PATENT DOCUMENTS

| | | |
|---|---|---|
| WO | WO-2004077134 | 9/2004 |
| WO | WO-2010087841 | 8/2010 |
| WO | WO-2011046562 | 4/2011 |
| WO | WO-2011046563 | 4/2011 |
| WO | WO-2011046564 | 4/2011 |

OTHER PUBLICATIONS

Braunecker, et al., "Controlled/living radical polymerization: Features, developments, and perspectives", Progress in Polymer Science, 2007, pp. 93-146, vol. 32, Elsevier.

(Continued)

*Primary Examiner* — Joseph P Martinez
*Assistant Examiner* — Brandi Thomas
(74) *Attorney, Agent, or Firm* — Dave Collins

(57) ABSTRACT

Pigment based inks are provided. The inks include a non-polar carrier fluid; and a surface-functionalized pigment particle including a nitrogen-inked moiety to the surface of the pigment particle through a nitrogen link at one end of the nitrogen-linked moiety and a block copolymer having at least two blocks attached at another end, the pigment particle suspended in the non-polar carrier fluid. A combination of an electronic display and an electronic ink employing the pigment and a process for making the pigment-based inks are also provided.

20 Claims, 9 Drawing Sheets

(56) References Cited

OTHER PUBLICATIONS

Moad, et al., "Living Radical Polymerization by the RAFT Process—A Second Update", Aust. J. Chem., 2009, pp. 1402-1472, vol. 62, CSIRO Publishing.

Moad, et al., "Radical addition—fragmentation chemistry in polymer synthesis", Polymer, 2008, pp. 1079-1131, vol. 49, Elsevier Ltd.

Moad, et al., "Toward Living Radical Polymerization", Accounts of Chemical Research, Sep. 2008, pp. 1133-1142, vol. 41, No. 9.

Tsarevsky, et al., ""Green" Atom Transfer Radical Polymerization: From Process Design to Preparation of Well-Defined Environmentally Friendly Polymeric Materials", Chemical Review, 2007, pp. 2270-2299, vol. 107.

Van Camp, et al., "From Novel Block-Like Copolymers to Reactive Nanoparticles: ATRP and "Click" Chemistry as Synthetic Tools" (Research Paper) NATO Science for Peace and Security Series A: Chemistry and Biology, 2009, pp. 111-132, vol. 2.

Wang, J.-S. et al., "Controlled/"living" radical polymerization. atom transfer radical polymerization in the presence of transition-metal complexes", J. American Chemical Society, 1995, pp. 5614-5615, vol. 117.

Zhou, et al. "Inks Including Pigments Having Tri-Block Copolymer Grafts" PCT/US2011/034447, Filed Apr. 29, 2011.

Zhou, et al., "Nitrogen-Linked Surface Functionalized Pigments for Inks", U.S. Appl. No. 13/098,205, filed Apr. 29, 2011.

\* cited by examiner

INKS INCLUDING BLOCK COPOLYMER GRAFTED PIGMENTS VIA AZIDE CHEMISTRY

BACKGROUND

Ultrathin, flexible electronic displays that look like print on paper have many potential applications including wearable computer screens, electronic paper, smart identity cards, store shelf labels, and signage applications. Electrophoretic or electrokinetic displays are an important approach to this type of medium. Electrophoretic actuation relies on particles moving under the influence of an electric field. Accordingly, the desired particles must exhibit good dispersibility and charge properties in non-polar dispersing media. Non-polar dispersing media are desirable because they help minimize the leakage currents in electrophoretic or kinetic devices.

Current commercial products based on electrophoretic display technology are only able to provide color and white states or black and white states. They cannot provide a clear or transparent state, which prevents use of a stacked architecture design. A stacked architecture of layered colorants would allow the use of transparent to colored state transitions in each layer of primary subtractive color resulting in print-like color in one display.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
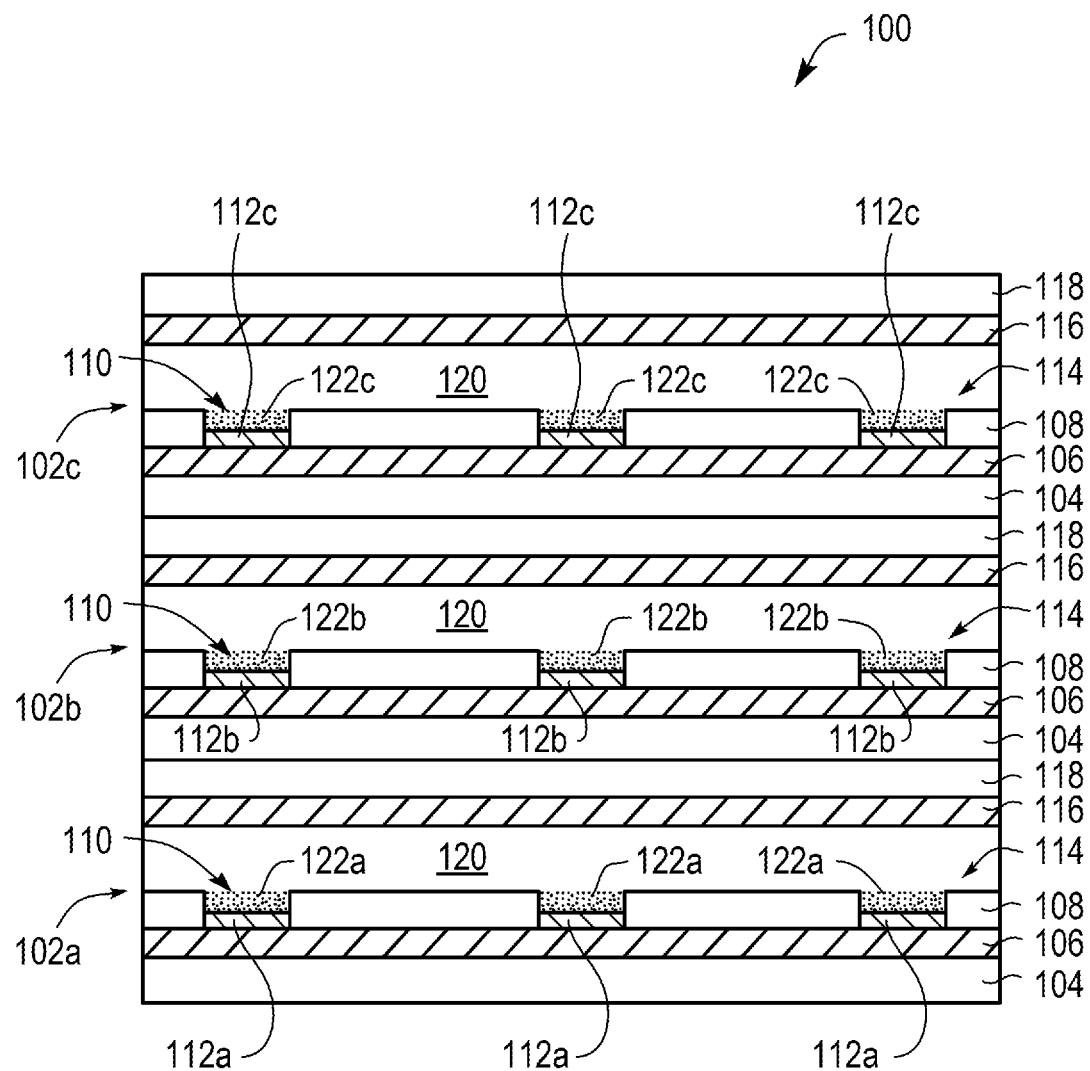
FIG. 1 depicts a cross-sectional view of one example of a stacked electro-optical display.

Reference is made now in detail to specific examples, which illustrates the best mode presently contemplated by the inventors for practicing the invention. Alternative examples are also briefly described as applicable.

In the following detailed description, reference is made to the accompanying drawings which form a part hereof, and in which is shown by way of illustration specific examples in which the disclosure may be practiced. In this regard, directional terminology, such as "top," "bottom," "front," "back," "leading," "trailing," etc., is used with reference to the orientation of the Figure(s) being described. Because components of examples can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense, and the scope of the present disclosure is defined by the appended claims.

As used herein, the term "grayscale" applies to both black and white images and monochromatic color images. Grayscale refers to an image including different shades of a single color produced by controlling the density of the single color within a given area of a display.

As used herein, the term "over" is not limited to any particular orientation and can include above, below, next to, adjacent to, and/or on. In addition, the term "over" can encompass intervening components between a first component and a second component where the first component is "over" the second component.

As used herein, the term "adjacent" is not limited to any particular orientation and can include above, below, next to, and/or on. In addition, the term "adjacent" can encompass intervening components between a first component and a second component where the first component is "adjacent" to the second component.

As used herein, the term "electronic ink display" is a display that forms visible images using one or more of electrophoresis, electro-convection, electro-osmosis, electrochemical interactions, and/or other electrokinetic phenomena.

As used herein, "about" means a ±10% variance caused by, for example, variations in manufacturing processes.

The article 'a' and 'an' as used in the claims herein means one or more.

Significant progress has been made towards developing working electronic inks based on the electrokinetic mechanism using conventional stabilization techniques and materials. However, improvements in reliability are still needed for commercially successful applications. These previous electronic inks are based on pigments with additional surfactants and charge directors, in which both charging and stabilization related functionality are not covalently bonded to the pigment surface. In this case, the pigment can lose charge with time under electric field or repeated switching cycles. The adsorbed stabilizing polymer material on the pigment surface is capable of desorbing and the free polymeric species in the solvent are capable of degradation as a result of cell operation. Additional surfactants in the solvent also result in higher background charges can lead to field screening effects.

Surface modification of $TiO_2$ pigment has been demonstrated, using a "random graft polymerization" method to introduce a polymer onto the $TiO_2$ pigment surface through polymerizable or polymerization-initiating groups attached to the surface of the particles. The major drawback of this approach is that polymers are formed in the presence of the particles. It is more difficult to obtain well controlled systems where the unintended products can be cleaned up more easily.

Bi-state and/or tri-state electrophoretic display cells (or elements) having a three-dimensional architecture for compacting charged colorant particles within the display cells are described in US Patent Publication 2010/0245981, published Sep. 30, 2010. A bi-state display cell having a dark state and a clear state is provided by an electronic ink with charged colorant particles in an optically transparent fluid. A clear state is achieved when the colorant particles are compacted and a colored state is achieved when the colorant particles are spread. An electronic ink with charged white particles in a colored fluid enables white and spot-color states, with the color of the colored state depending on the color of the fluid.

The ink fluid is colored by a dye, nanoparticle colorants, pigments, or other suitable colorants. A white state is achieved when the white particles are spread and held in proximity to the surfaces closest to the viewer, and a colored state is achieved when the white particles are compacted to allow absorption by the colorant fluid and subsequent reflection by a diffuse reflector in the back of the cell, or when the white particles are distributed throughout the colorant fluid to backscatter the light that has not been absorbed by the colorant fluid. By combining the white particles in the colored fluid with a different colored resin on the back of the display cell, a tri-state display cell is provided.

An electrophoretic display cell may include a three-dimensional architecture to provide a clear optical state. In this architecture, the geometrical shape of the display cell has narrowing portions in which electrophoretically/electrokinetically translated colorant particles collect and compact in response to appropriate bias conditions applied to driving electrodes on opposite sides of the display cell. The three-dimensional structure of the display cell introduces additional control of electrophoretically/electrokinetically moving colorant particles. As a result, desired functionalities can be achieved with a more stable electrophoretic/kinetic ink that resists irreversible agglomeration of the particles, but maintains its ability to both disperse and collect and compact the particles. The driving electrodes are passivated with a dielectric layer, thus eliminating the possibility of electrochemical interactions through the driving electrodes from direct contact with the electrophoretic ink. In other examples, the driving electrodes are not passivated, thus allowing electrochemical interactions with the electrophoretic/kinetic ink.

An example of a stacked device architecture is shown in FIG. 1. This configuration allows stacking of colored layers for electrophoretic/kinetic displays.

FIG. 1 illustrates a cross-sectional view of one example of stacked electro-optical display 100. Electro-optical display 100 includes a first display element 102a, a second display element 102b, and a third display element 102c. Third display element 102c is stacked on second display element 102b, and second display element 102b is stacked on first display element 102a.

Each display unit includes a first substrate 104, a first electrode 106, a dielectric layer 108 including reservoir or recess regions 110, thin layers 112, a display cell 114, a second electrode 116, and a second substrate 118. Display cell 114 is filled with a carrier fluid 120 with colorant particles 122. In some examples, thin layers 112 may be opaque. In other examples, thin layers 112 may be transparent.

First display element 102a includes thin layers 112a self-aligned within recess regions 110. First display element 102a also includes colorant particles 122a having a first color (e.g., cyan) for a full color electro-optical display.

Second display element 102b includes thin layers 112b self-aligned within recess regions 110. Second display element 102b also includes colorant particles 122b having a second color (e.g., magenta) for a full color electro-optical display.

Third display element 102c includes thin layers 112c self-aligned within recess regions 110. Third display element 102c also includes colorant particles 122c having a third color (e.g., yellow) for a full color electro-optical display. In other examples, colorant particles 122a, 122b, and 122c may include other suitable colors for providing an additive or subtractive full color electro-optical display.

In the example illustrated in FIG. 1, in the electro-optical display 100, first display element 102a, second display element 102b, and third display element 102c are aligned with each other. As such, thin layers 112a, 112b, and 112c are also aligned with each other. In this example, since recess regions 110 and self-aligned thin layers 112a, 112b, and 112c of each display element 102a, 102b, and 102c, respectively, are aligned, the clear aperture for stacked electro-optical display 100 is improved compared to a stacked electro-optical display without such alignment.

In an alternate example (not shown), first display element 102a, second display element 102b, and third display element 102c may be offset from each other. As such, thin layers 112a, 112b, and 112c are also offset from each other. In this example, since recess regions 110 and self-aligned thin layers 112a, 112b, and 112c are just a fraction of the total area of each display element 102a, 102b, and 102c, respectively, the clear aperture for stacked electro-optical display 100 remains high regardless of the alignment between display elements 102a, 102b, and 102c. As such, the process for fabricating stacked electro-optical display 100 is simplified. The self-aligned thin layers 112a, 112b, and 112c prevent tinting of each display element due to colorant particles 122a, 122b, and 122c, respectively, in the clear optical state. Therefore, a stacked full color electro-optical display having a bright, neutral white state and precise color control is provided.

As indicated above, this architecture enables both clear and colored states. However, developing electronic inks that work in this architecture has been challenging. The materials used in presently-available commercial products do not work in this architecture, since they do not provide clear states. Significant progress toward developing working electronic inks for this architecture has been made; see, e.g., PCT/US2009/060971 ("Electronic Inks"); PCT/US2009/060989 ("Dual Color Electronically Addressable Ink"); and PCT/US2009/060975 ("Electronic Inks"), all filed Oct. 16, 2009.

The foregoing discussion is directed primarily to stacked cells in an electro-optical display. However, the functionalized pigments disclosed herein may also be employed in lateral cells in an electro-optical display.

Figure 2:
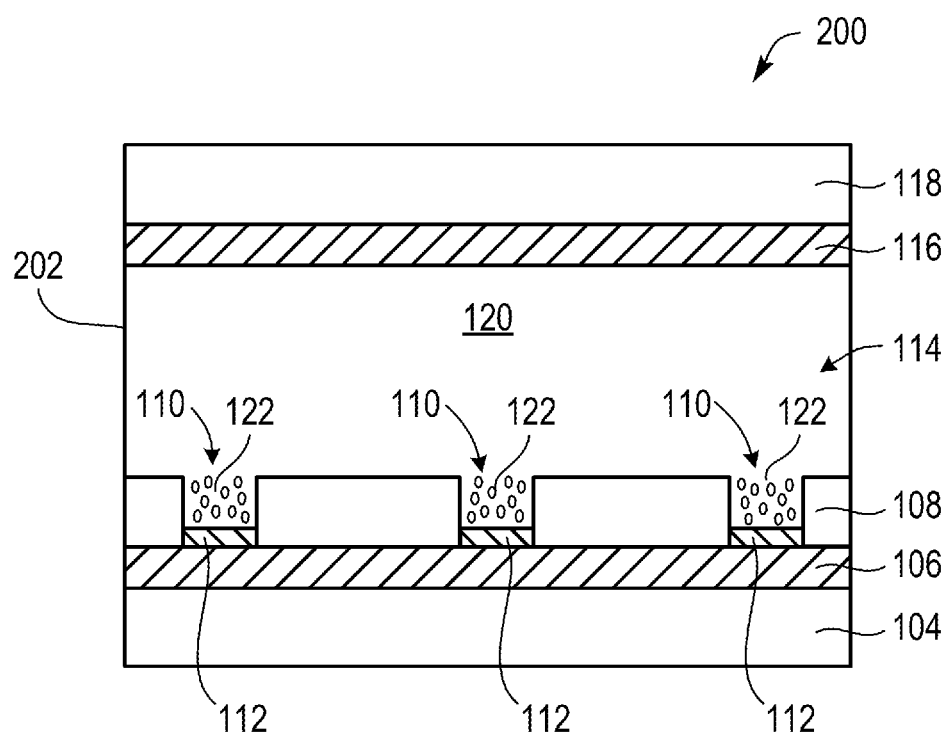
FIG. 2 illustrates a cross-sectional view of one example of a lateral electro-optical display.

FIG. 2 illustrates a cross-sectional view of one example of lateral electro-optical display 200. Electro-optical display 200 includes a display element 202. Additional display elements may be disposed laterally in the x and y directions, as side-by-side sub-pixels or segments, with each display element containing inks having colorant particles 122 of different colors, or having black colorant particles that are collected to reveal patterned color filters or wavelength-selective reflectors below.

Each display element 202 is similar to electro-optical display 100a previously described and illustrated with reference to FIG. 1. Each display element 202 may include circular shaped thin layers 110a self-aligned within recess regions 108. Each display element 202 may also include colorant particles 122 having a color (e.g., cyan, magenta, yellow, black, or white) for a full color electro-optical display. In other examples, colorant particles 122 may include other suitable colors for providing an additive or subtractive full color electro-optical display. In accordance with the teachings herein, a new method of introducing the block co-polymers (di-block or tri-block) onto tetrafluorophenyl azide moiety and then grafting them onto pigment surfaces is provided. This surface modification technology can be applied to both organic and inorganic pigments.

In accordance with the teachings herein, novel stable inks, specifically, electronic inks, based on utilizing tri-block (or di-block) copolymers grafted onto pigment colorant particles via azide chemistry are disclosed. A new versatile class of nitrogen-linked surface functionalized pigments for inks is employed. These nitrogen-linked surface functionalized pigments may be functionalized via azide chemistry to include a broad range of acidic and basic functional groups. Additionally, they are easier to manufacture because the pigment particles do not have to be coated with a metal oxide, such as silicon dioxide, before being functionalized, as was required in the past. Finally, these nitrogen-linked surface functionalized pigments exhibit better switching behavior and longer lifetime due to the presence of covalent bonding between the functional group and the pigment particle.

Also disclosed are methods of grafting particles with tri-block (or di-block) copolymers via surface initiated (living) polymerization techniques such as atom transfer radical polymerization (ATRP) or reversible addition-fragmentation chain transfer (RAFT). The particles grafted with these novel functionalized tri-block (or di-block) copolymers can be self-dispersed into non-polar solvents and supply both steric stabilization and particle charging functionality while minimizing the need for additional surfactants or charge directors.

These functionalized block co-polymers are designed to have two portions (di-block) or three portions (tri-block) that are grafted to the particle or subsequent polymer ends in a step-wise fashion.

In the case of tri-block copolymers, the first (inner) and third (outer) blocks that comprise the inner and outer ends of the polymer chain respectively each contain bulky organic groups to help facilitate the solubility of such functionalized polymers in the solvent and provide a steric stabilization to the resulting particle dispersion. The middle block portion contains either acidic or basic functionalized side groups that facilitate charging of the particle.

In the case of di-block copolymers, the inner block contains either acidic or basic functionalized side groups that facilitate charging of the particle. The outer block contains bulky organic groups to help facilitate the solubility of such functionalized polymers in the solvent and provide a steric stabilization to the resulting particle dispersion.

Such stable and charged particle dispersions can be used for a variety of applications such as pigments as colorants in electrophoretic/electrokinetic displays, particles to improve the bistability of anisotropic fluid electrophoretic displays (such as electrophoretic colorant particles in a liquid crystal host), and as field-addressable dielectric media for tuning the local index of refraction near an array of metallic nanostructures in order to tune the optical spectral response of plasmon resonance effect generated by the nanostructure array. This surface modification technology can be applied to both organic and inorganic pigments.

The bulk of the description herein is based on tri-block copolymers. However, it will be readily apparent that omitting one of the process steps leads to di-block copolymers.

Conventional use of polymers to stabilize particle dispersions involves an equilibrium adsorption of polymer or surfactant molecules to the particle surface. In order to maintain an adequate amount of particle coverage, a relatively larger degree of free polymer must remain in the solvent to maintain equilibrium. This creates several challenges in electrophoretic systems. First, this polymer can form or modify the formation of reverse-micelle structures, significantly increasing the total charge in the system as a background species that is not directly associated with the particle charge. This excessive charge can lead to screening of insulated electrode systems and limit the extent of desired particle motion by nature of reducing the amplitude of the applied field that is present in the bulk fluid region. In exposed electrode systems, the free polymer can either be irreversibly damaged or contribute to degradation of the electrode function, leading to lifetime-time limiting behaviors and switching degradation.

The disclosure herein provides methods of dispersing particles in non-polar solvents using novel functionalized tri-block copolymers grafted in a step-wise process. The resulting particle polymer encapsulation minimizes the need for additional surfactants. Electronic inks based on such tri-block copolymer encapsulated particles are robust, because the tri-block copolymer composition is covalently bonded to the particle surfaces. The independent design of the various polymer blocks provides some design flexibility for the control of a stable particle dispersion and the charge characteristics for a particle species. This can have a positive influence on the switching speed performance and lifetime of electronic inks. Using this new technology, one can also make an electronic ink with both positively a charged colorant species and a negatively charged colorant species. In this manner, each species is a different color particle or pigment type which can be independently controlled in the same ink volume. The disclosed invention employs the designed steric stabilization feature of the polymer blocks to prevent agglomeration and precipitation of the oppositely charged colorant species.

ATRP (Atom Transfer Radical Polymerization) and RAFT (Reversible Addition-Fragmentation chain Transfer) are two surface-initiated living polymerization methods, also referred to as living polymerization methods, by which polymers can be formed. In these methods, polymerization can only occur on an initiator group, and is subsequently transferred to the end of the just added polymer chain. There are publications in the scientific literature about the application of these methods to make new polymers, but none of them deals with grafting functional block copolymers onto a pigment surface.

In polymer chemistry, living polymerization is a form of addition polymerization where the ability of a growing polymer chain to terminate has been removed. This can be accomplished in a variety of ways. Chain termination and chain transfer reactions are absent and the rate of chain initiation is also much larger than the rate of chain propagation. The result is that the polymer chains grow at a more constant rate than seen in traditional chain polymerization and their lengths remain very similar (i.e. they have a very low polydispersity index). Living polymerization is a popular method for synthesizing block copolymers since the polymer can be synthesized in stages, each stage containing a different monomer. Additional advantages are predetermined molar mass and control over end-groups.

In ATRP, the uniform polymer chain growth, which leads to low polydispersity, stems from use of a transition metal-based catalyst. This catalyst provides an equilibrium between active, and therefore propagating, polymer and an inactive form of the polymer; known as the dormant form. Since the dormant state of the polymer is vastly preferred in this equilibrium, side reactions are suppressed. This equilibrium in turn lowers the concentration of propagating radicals, therefore suppressing unintentional termination and controlling molecular weights. ATRP reactions are very robust in that they are tolerant of many functional groups such as allyl, amino, epoxy, hydroxy, and vinyl groups present in either the monomer or the initiator. ATRP methods may also be advantageous due to the ease of preparation, commercially available and inexpensive catalysts (copper complexes), pyridine based ligands and initiators (alkyl halides).

RAFT is a type of living polymerization involving a conventional radical polymerization in the presence of a reversible chain transfer reagent. Like other living polymerizations, there is no termination step in the RAFT process. It is a very versatile method to form low polydispersity polymer from monomers capable of radical polymerization. The reaction is usually done with a dithioester. The dithio compound must have a good homolytic leaving group, R, whose radical must be capable of initiating a polymerization reaction. There are four steps in raft polymerization: initiation, addition-fragmentation, reinitiation and equilibration.

The present invention describes a step-wise method of grafting novel functionalized tri-block (or di-block) copolymers onto a particle or pigment surface via azide chemistry and the formulation of stable electronic inks based on this surface modified pigments. The illustrations shown in the following paragraphs are based on tri-block copolymers. It would be obvious that omitting one of the steps would lead to di-block copolymers.

The structure of such tri-block co-polymers in combination with an azide, specifically, tetrafluorophenyl azide, is shown in Formula 1:

Formula 1

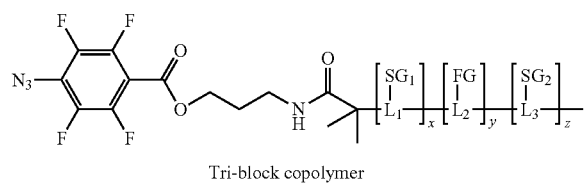

Tri-block copolymer wherein,
$L_1$, $L_2$, and $L_3$ are each independently a covalent bond or chemical structure providing a covalent bond between different blocks, such as C—C, C═C, C═N, C≡C, or N≡N, for example.

$SG_1$ and $SG_2$ each independently represent a solubilizing and sterically bulky group, which helps to improve the solubility of the polymer and stabilize the nano-composite material; they can be any of alkyl groups, alkoxy groups, branched alkyl groups, branched alkoxy groups, or substituted aryl groups, for example.

FG represents a functional group that provides charging sites to pigment surfaces; it can be an acidic functional group such as hydroxyl, carboxylate, a sulfonic acid, a phosphonic acid, or a phosphorous acid, for example, or, alternatively, it can be a basic group such as a primary amine, secondary amine, tertiary amine, pyridine, or imidazoline, for example.

The letters x, y and z are each independently an integer between 1 and about 5,000.

A di-block copolymer omits either the $SG_1$-$L_1$ moiety or the $SG_2$-$L_3$ moiety. However, in some examples, the $SG_1$-$L_1$ moiety is omitted, so as to leave the $SG_2$-$L_3$ moiety as the outer, protective moiety.

It should be noted that the discussion herein is presented largely in terms of tetrafluorophenyl azide for the sake of convenience and because tetrafluorophenyl azide is a highly efficient reagent. However, it is noted that other azides may also be employed in accordance with the reaction schemes described herein to include a desired functional group.

Tetrafluorophenyl azide is commonly used in azide reactions because it reacts highly efficiently in comparison to other aromatics and non-aromatics. The high efficiency of tetrafluorophenyl azide in reactions is due to the presence of fluorine groups, which serve as powerful electron withdrawing groups that can activate the benzene ring. In other examples, the starting reagent in azide reactions may be methyl benzoate substituted with other halogens, such as chlorine or bromine groups. However, these other halogens are less electro-negative and are not as powerful an electron withdrawing group. Accordingly, methyl benzoate substituted with chlorine or bromine groups may not react as efficiently as methyl benzoate substituted with fluorine groups. Additionally, although other aromatics may be substituted with fluorine groups as well, these fluoro-substituted aromatics are often more expensive to formulate and accordingly, may be less economical than fluoro-substituted benzenes. Finally, although non-aromatics may be used in place of aromatics, reactions with non-aromatics are harder to control. For example, a non-aromatic nitrene is very reactive and may polymerize.

Formula 2 shows a general example of such tri-block copolymer with an azide that can be grafted onto pigment surfaces, in which three blocks are connected with carbon-carbon single bond.

Formula 2

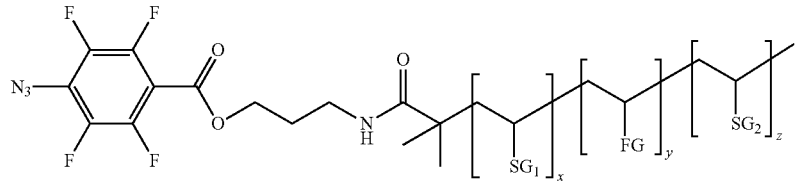

wherein,
$SG_1$ and $SG_2$, FG, and x, y, and z are as described for Formula 1.

A di-block copolymer either the $SG_1$ moiety or the $SG_2$ moiety. However, in some examples, the $SG_1$ moiety is omitted, so as to leave the $SG_2$ moiety as the outer, protective moiety.

Examples of monomers that can be grafted as the inner and outer blocks ($SG_1$ and $SG_2$) to provide stabilizing functions are shown below:

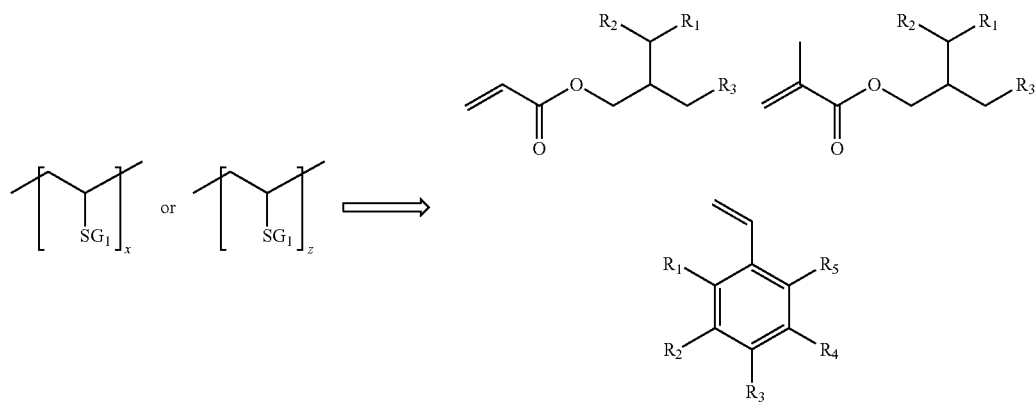

wherein

R$_1$, R$_2$, R$_3$, R$_4$, and R$_5$ are independently selected from alkyl groups, alkoxy groups, branched alkyl groups, branched alkoxy groups, or substituted aryl groups, for example.

Examples of monomers that can be grafted as the middle block (FG) (or inner block in the case of di-block copolymers) to provide charges to the pigment surfaces are shown below:

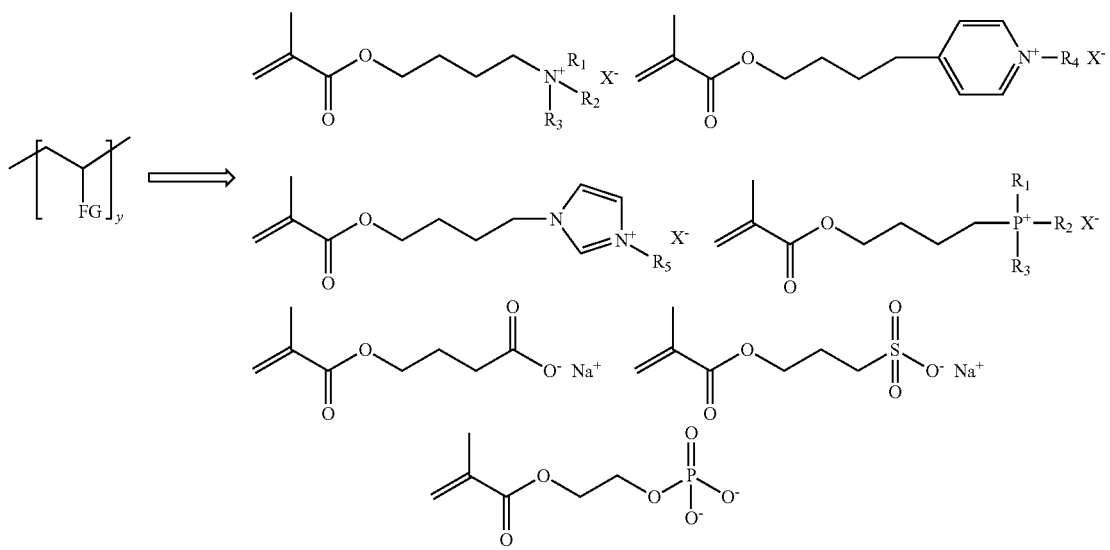

wherein

R$_1$, R$_2$, R$_3$, R$_4$, and R$_5$ are as described above.

Figure 3:
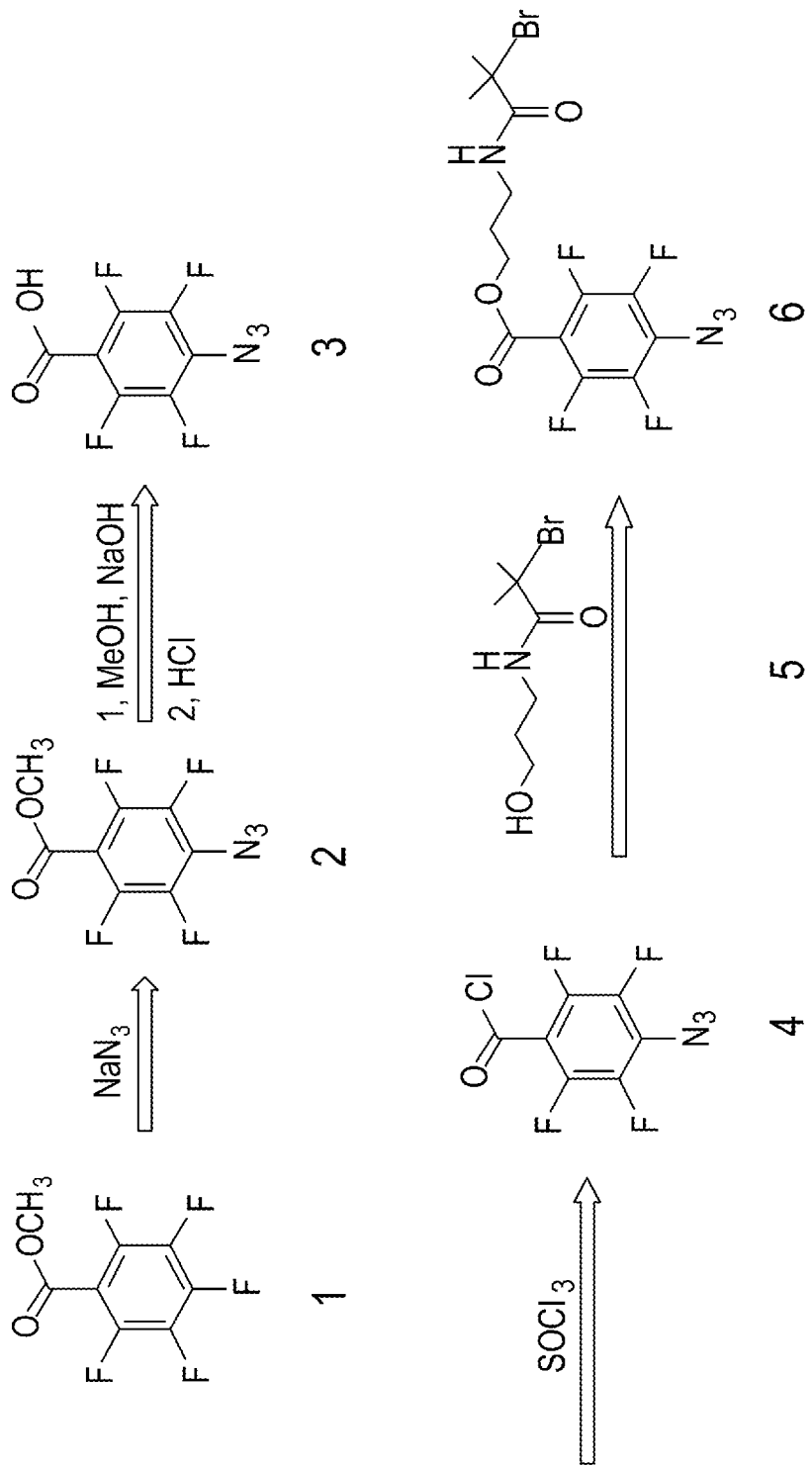
FIG. 3 is a schematic diagram of an example reaction scheme for forming a tetrafluorophenyl azide useful in the practice of the processes disclosed herein.

The process depicted in the following Figures employs a tetrafluorophenyl azide-based initiator. As shown in FIG. 3, the tetrafluorophenyl azide initiator may be prepared by reacting commercially-available methyl pentafluoro-benzoate (1) with sodium azide to yield compound (2), in which the azide functionality substitutes in the para position. Hydrolysis of compound (2) with sodium hydroxide yields tetrafluorophenyl azide acid (3). Reaction of tetrafluorophenyl azide acid (3) with thionyl chloride gives tetrafluorophenyl azide acid chloride (4), which in turn reacts with 2-bromo-N-(3-hydroxypropyl)-2-methylpropanamide (5) to give tetrafluorophenyl azide-based initiator (6). The azide-based initiator may be used to form the tri-block (or di-block) copolymers, as described in greater detail below.

The acid chloride (4) may be reacted with a number of compounds, including amides and esters, to provide the initiator (6). In addition to 2-bromo-N-(3-hydroxypropyl)-2-methylpropanamide (5), examples of such other compounds include, but are not limited to, 2-iodo-N-(3-hydroxypropyl)-2-methylpropanamide, 2-chloro-N-(3-hydroxypropyl)-2-methylpropanamide, 2-bromo-N-(3-hydroxyethyl)-2-methylpropanamide, 2-iodo-N-(3-hydroxyethyl)-2-methylpropanamide, 2-chloro-N-(3-hydroxyethyl)-2-methylpropanamide, 2-bromo-N-(3-hydroxybutyl)-2-methylpropanamide, 2-iodo-N-(3-hydroxybutyl)-2-methylpropanamide, 2-chloro-N-(3-hydroxybutyl)-2-methylpropanamide, 2-bromo-N-(3-hydroxypentyl)-2-methylpropanamide, 2-iodo-N-(3-hydroxypentyl)-2-methylpropanamide, 2-chloro-N-(3-hydroxypentyl)-2-methylpropanamide, 2-bromo-N-(3-hydroxyhexyl)-2-methylpropanamide, 2-iodo-N-(3-hydroxyhexyl)-2-methylpropanamide, 2-chloro-N-(3-hydroxyhexyl)-2-methylpropanamide, 2-bromo-(3-hydroxypropyl)-2-methylpropanoic acid ester, 2-iodo-(3-hydroxypropyl)-2-methylpropanoic acid ester, 2-chloro-(3-hydroxypropyl)-2-methylpropanoic acid ester, 2-bromo-(3-hydroxyethyl)-2-methylpropanoic acid ester, 2-iodo-(3-hydroxyethyl)-2-methylpropanoic acid ester, 2-chloro-(3-hydroxyethyl)-2- methylpropanoic acid ester, 2-bromo-(3-hydroxybutyl)-2-methylpropanoic acid ester, 2-iodo-(3-hydroxybutyl)-2-methylpropanoic acid ester, 2-chloro-(3-hydroxybutyl)-2-methylpropanoic acid ester, 2-bromo-(3-hydroxypentyl)-2-methylpropanoic acid ester, 2-iodo-(3-hydroxypentyl)-2-methylpropanoic acid ester, 2-chloro-(3-hydroxypentyl)-2-methylpropanoic acid ester, 2-bromo-(3-hydroxyhexyl)-2-methylpropanoic acid ester, 2-iodo-(3-hydroxyhexyl)-2-methylpropanoic acid ester, 2-chloro-(3-hydroxyhexyl)-2-methylpropanoic acid ester, 4-(chloromethyl)-N-(3-hydroxypropyl)benzamide, 3-(hydroxypropyl)-4-(chloromethyl)benzoic acid ester, 4-(bromomethyl)-N-(3-hydroxypropyl)benzamide, 3-(hydroxypropyl)-4-(bromomethyl)benzoic acid ester, 4-(iodomethyl)-N-(3-hydroxypropyl)benzamide, 3-(hydroxypropyl)-4-(iodomethyl)benzoic acid ester, 4-(chloromethyl)-N-(3-hydroxyethyl)benzamide, 3-(hydroxyethyl)-4-(chloromethyl)benzoic acid ester, 4-(bromomethyl)-N-(3-hydroxyethyl)benzamide, 3-(hydroxyethyl)-4-(bromomethyl)benzoic acid ester, 4-(iodomethyl)-N-(3-hydroxyethyl)benzamide, 3-(hydroxyethyl)-4-(iodomethyl)benzoic acid ester, 4-(chloromethyl)-N-(3-hydroxybutyl)benzamide, 3-(hydroxybutyl)-4-(chloromethyl)benzoic acid ester, 4-(bromomethyl)-N-(3-hydroxybutyl)benzamide, 3-(hydroxybutyl)-4-(bromomethyl)benzoic acid ester, 4-(iodomethyl)-N-(3-hydroxybutyl)benzamide, 3-(hydroxybutyl)-4-(iodomethyl)benzoic acid ester, 4-(chloromethyl)-N-(3-hydroxypentyl)benzamide, 3-(hydroxypentyl)-4-(chloromethyl)benzoic acid ester, 4-(bromomethyl)-N-(3-hydroxypentyl)benzamide, 3-(hydroxypentyl)-4-(bromomethyl)benzoic acid ester, 4-(iodomethyl)-N-(3-hydroxypentyl)benzamide, 3-(hydroxypentyl)-4-(iodomethyl)benzoic acid ester, 4-(chloromethyl)-N-(3-hydroxyhexyl)benzamide, 3-(hydroxyhexyl)-4-(chloromethyl)benzoic acid ester, 4-(bromomethyl)-N-(3-hydroxyhexyl)benzamide, 3-(hydroxyhexyl)-4-(bromomethyl)benzoic acid ester, 4-(iodomethyl)-N-(3-hydroxyhexyl)benzamide, and 3-(hydroxyhexyl)-4-(iodomethyl)benzoic acid ester.

Figure 4A:
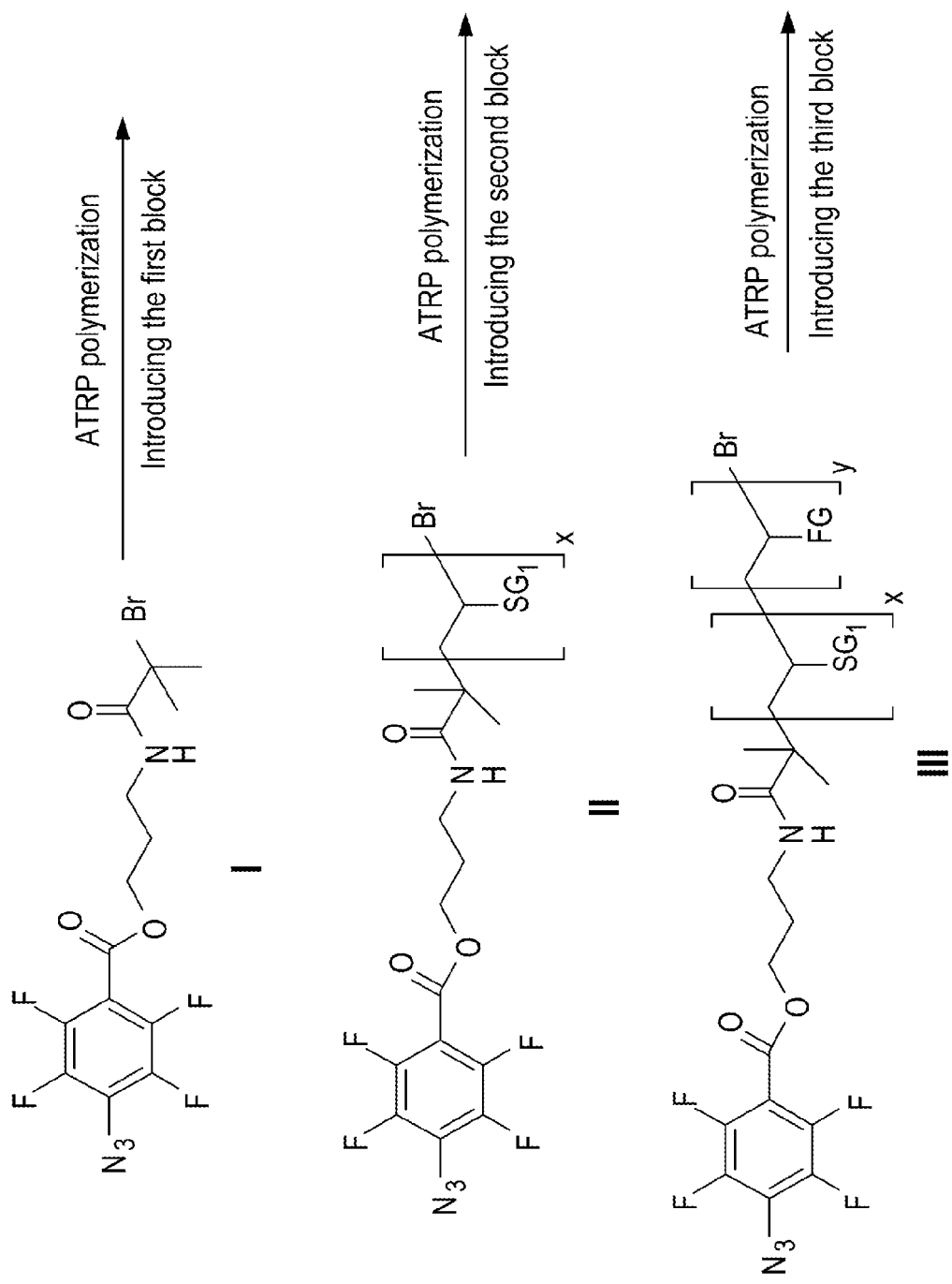
FIGS. 4A-4B depict an example of a process for grating a functionalized tri-block copolymer onto pigment surfaces via azide chemistry.
Figure 4B:
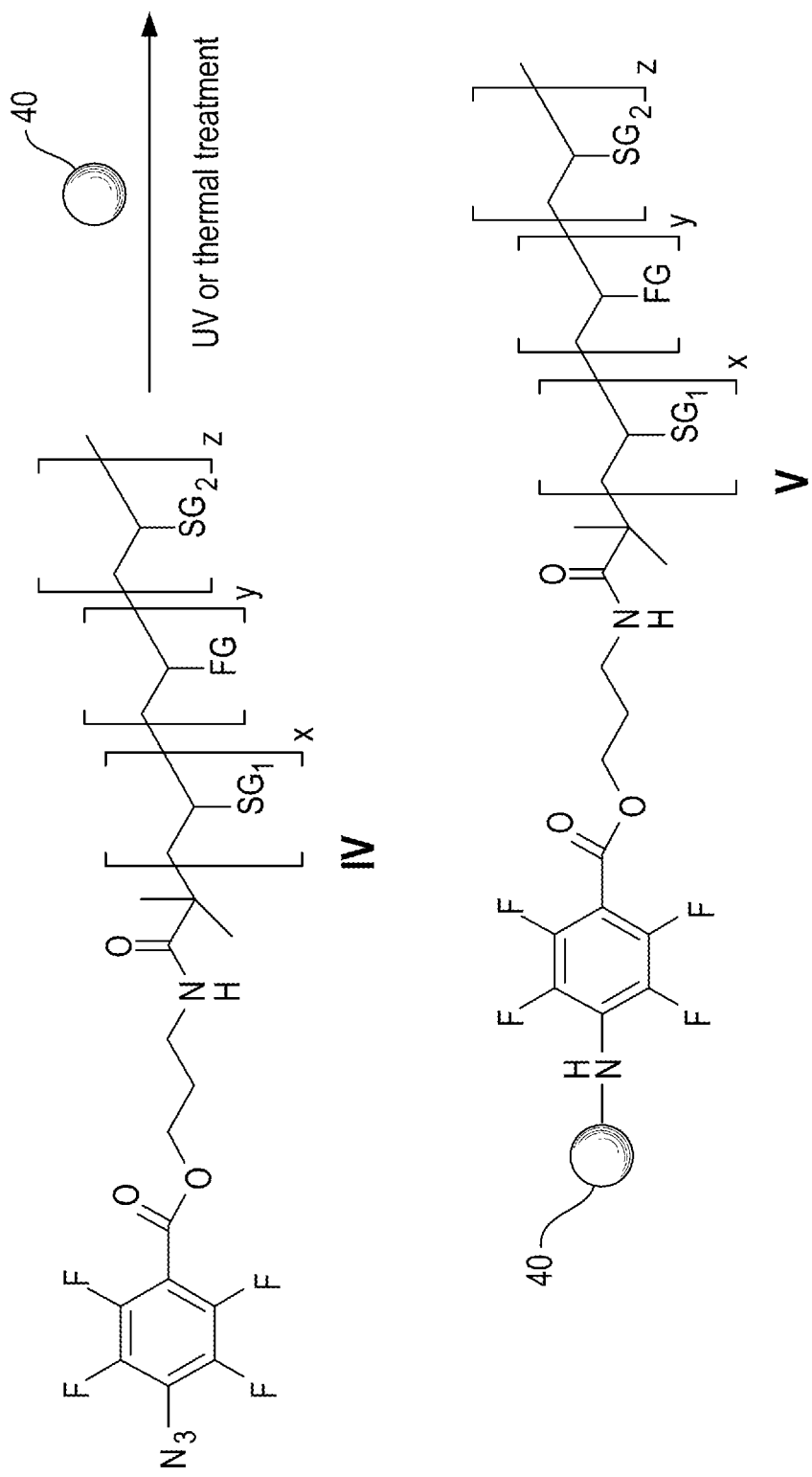

Shown in FIGS. 4A-4B is a process for grafting such functionalized tri-block copolymer onto pigment surfaces via azide chemistry. The process is split into two figures for clarity. In FIG. 4A, tetrafluorophenyl azide initiator (I) initiates the polymerization of the first block monomer to give the first block tetrafluorophenyl azide living polymer (II). Addition of the second monomer to the living polymer (II) yields the two-block tetrafluorophenyl living polymer (III). Addition of third monomer to living polymer (III) give three-block tetrafluorophenyl azide polymer (IV) (shown in FIG. 4B). Alternatively, a di-block copolymer with only the FG and $SG_1$ or $SG_2$ can be prepared by omitting one of the addition steps, as described above. In FIG. 4B, a coupling reaction of inorganic or organic pigments 40 with three-block (or di-block copolymer, not shown) tetrafluorophenyl azide polymer (IV) upon UV or thermal irradiation gives functionalized tri-block copolymers grafted pigment (V). Such block copolymers grafted pigments can be mixed with other surfactants or charge directors to form charged and stable pigment dispersions for electronic ink applications.

The process depicted in FIGS. 4A-4B is based on the use of the ATRP process. Besides ATRP, however, other common surface-initiated polymerization methods may be employed, such as nitroxide-mediated polymerization (NMP) and reversible addition-fragmentation chain transfer (RAFT) polymerization. For the NMP method, alkoxyamine initiators may be used. For the RAFT method, dithioester chain transfer agents may be used as initiators. In any case, the rest of process is the same.

Further, in all cases, the azide moiety including the di-block or tri-block copolymer is reacted with the pigment particle under UV irradiation at 280 to 400 nm or is heated to 25° to 200° C. to form the functionalized di-block or tri-block, respectively, copolymer grafted pigment. During the reaction, the azide group undergoes decomposition to lose one $N_2$ gas molecule to form a reactive intermediate, a nitrene, which then reacts with C—H, O—H, N—H, and/or C=C bonds of the pigment to bond di-block or tri-block copolymers covalently to the pigments. The copolymer thus is grafted onto the pigment surface through the tetrafluorophenyl azide via a nitrogen link, and what was the tetrafluorophenyl azide is now simply termed a nitrogen-linked moiety.

The surface modification of pigment takes place upon UV irradiation or heating of a mixture pigment 40 with the reagent (IV), giving the covalent bonded tri-block copolymer modified pigments (V). Since the coupling reaction between azide (IV) with pigment is the insertion reaction between a nitrene and C—H, O—H and N—H bonds, this surface modification technology can be applied to both organic and inorganic pigments.

In the reaction scheme depicted in FIGS. 4A-4B:
$SG_1$ and $SG_2$ are independently selected from alkyl groups, alkoxy groups, branched alkyl groups, branched alkoxy groups and substituted phenyl groups, for example.

FG is a binding group and may be any of primary amines, secondary amines, tertiary amines, amides, nitriles, isonitriles, cyanates, isocyanates, thiocyanates, isothiocyanates, azides, thiols, thiolates, sulfides, sulfinates, sulfonates, phosphates, hydroxyls, alcoholates, phenolates, carbonyls, carboxylates, phosphines, phosphine oxides, phosphonic acids, phosphoramides, and phosphates.

The letters x, y and z are each independently an integer between 1 and about 5,000.

The sphere ball 40 represents any possible electrophoretic particles with all possible colors such as red-green-blue (RGB) or cyan-yellow-magenta (CYM), as well as white (e.g., $TiO_2$) or black (e.g., carbon black). It may be a colored pigment or a colored polymeric particle, with a particle size ranging from 50 nm to 1 μm.

Figure 5A:
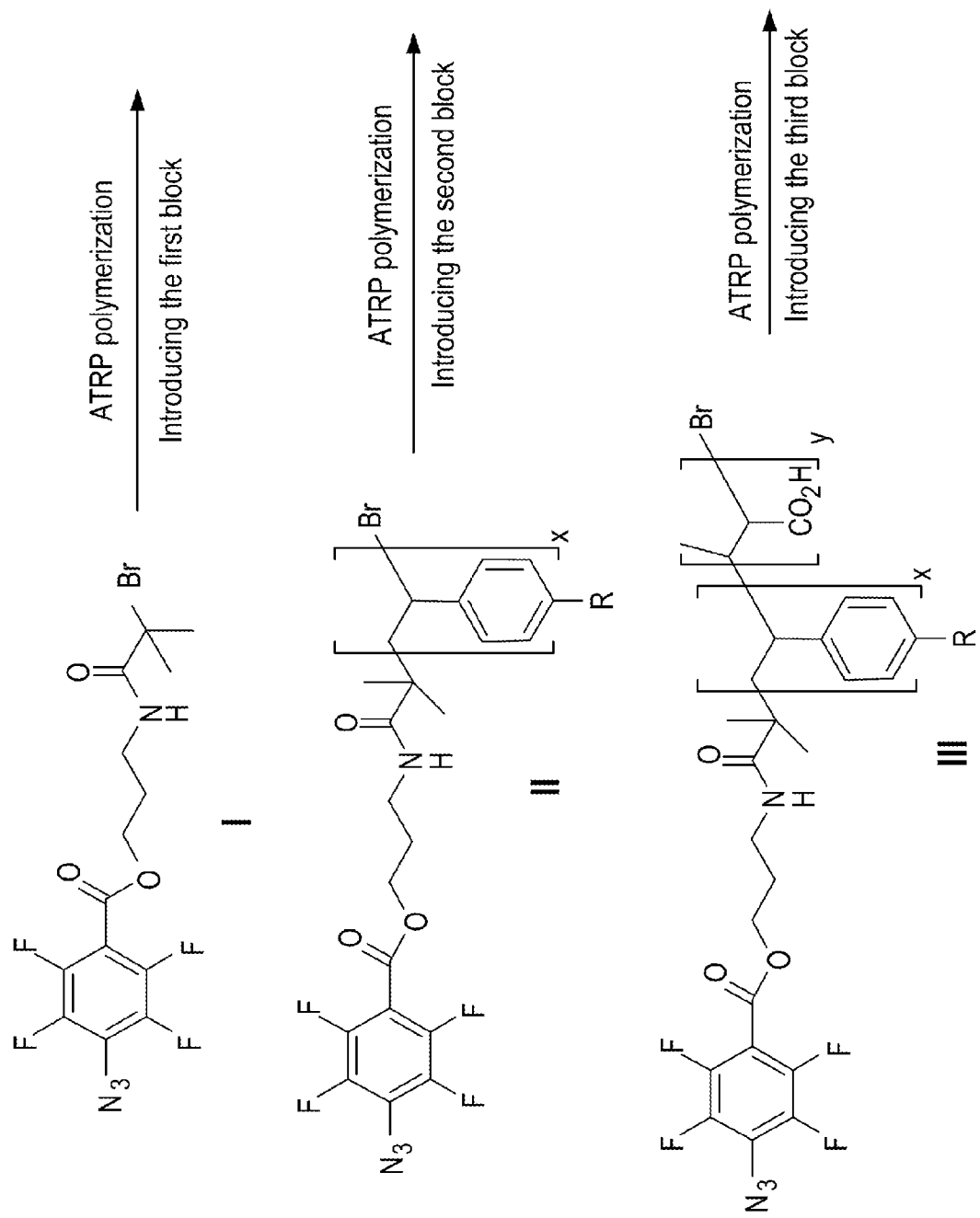
FIGS. 5A-5B depict a specific example of a process for grafting a functionalized tri-block copolymer onto pigment surfaces via azide chemistry, bearing a negative charge.
Figure 5B:
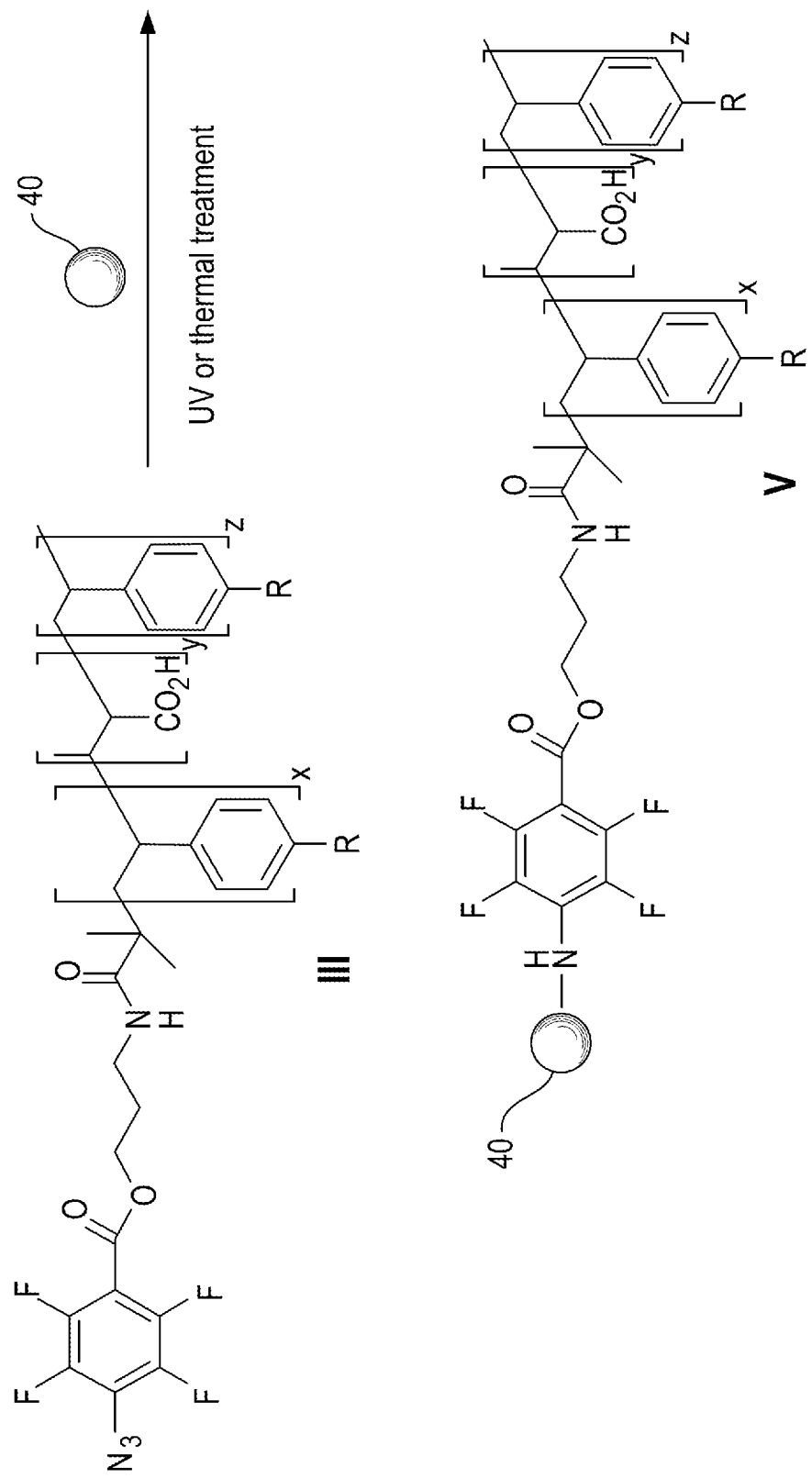

Shown in FIGS. 5A-5B is a specific example of a tri-block copolymer grafted pigment that can bear a negative charge via azide chemistry. The process is split into two figures for clarity. In FIG. 5A, this example employs polyacrylic acid and polystyrene based tri-block co-polymers. Tetrafluorophenyl azide initiator (I) undergoes the first polymerization with the first block monomer, substituted styrenes, to give the first block, polystyrene tetrafluorophenyl azide living polymer (II). Living polymer (II) undergoes the second polymerization with the second block monomer, acrylic acid, to give two-block polystyrene and polyacrylic acid tetrafluorophenyl living polymer (III). Living polymer (III) undergoes the third polymerization with the third block monomer, substituted styrene, to give three-block (polystyrene, polyacrylic acid and polystyrene tetrafluorophenyl azide) polymer (IV) (shown in FIG. 5B). In FIG. 5B, coupling reaction of inorganic or organic pigments 40 with three-block, polystyrene, polyacrylic acid and polystyrene tetrafluorophenyl azide polymer (IV) upon UV irradiation gives functionalized tri-block copolymers grafted pigment (V). Such tri-block copolymers grafted pigments can be mixed with other surfactants or charge directors to form charged and stable pigment dispersions for electronic ink applications.

In the reaction scheme depicted in FIGS. 5A-5B:
R represents sterically bulky group, which helps to improve the solubility of the polymer and stabilize the nano-composite material. It could be any alkyl groups, alkoxy groups, branched alkyl groups and branched alkoxy groups.
The letters x, y and z are an integer between 1 and about 5,000.
The sphere ball 40 represents any possible electrophoretic particles with all possible colors such as RGB or CYM, as well as white and black. It may be a colored pigment or a colored polymeric particle with a particle size ranging from 50 nm to 1 µm.

Figure 6A:
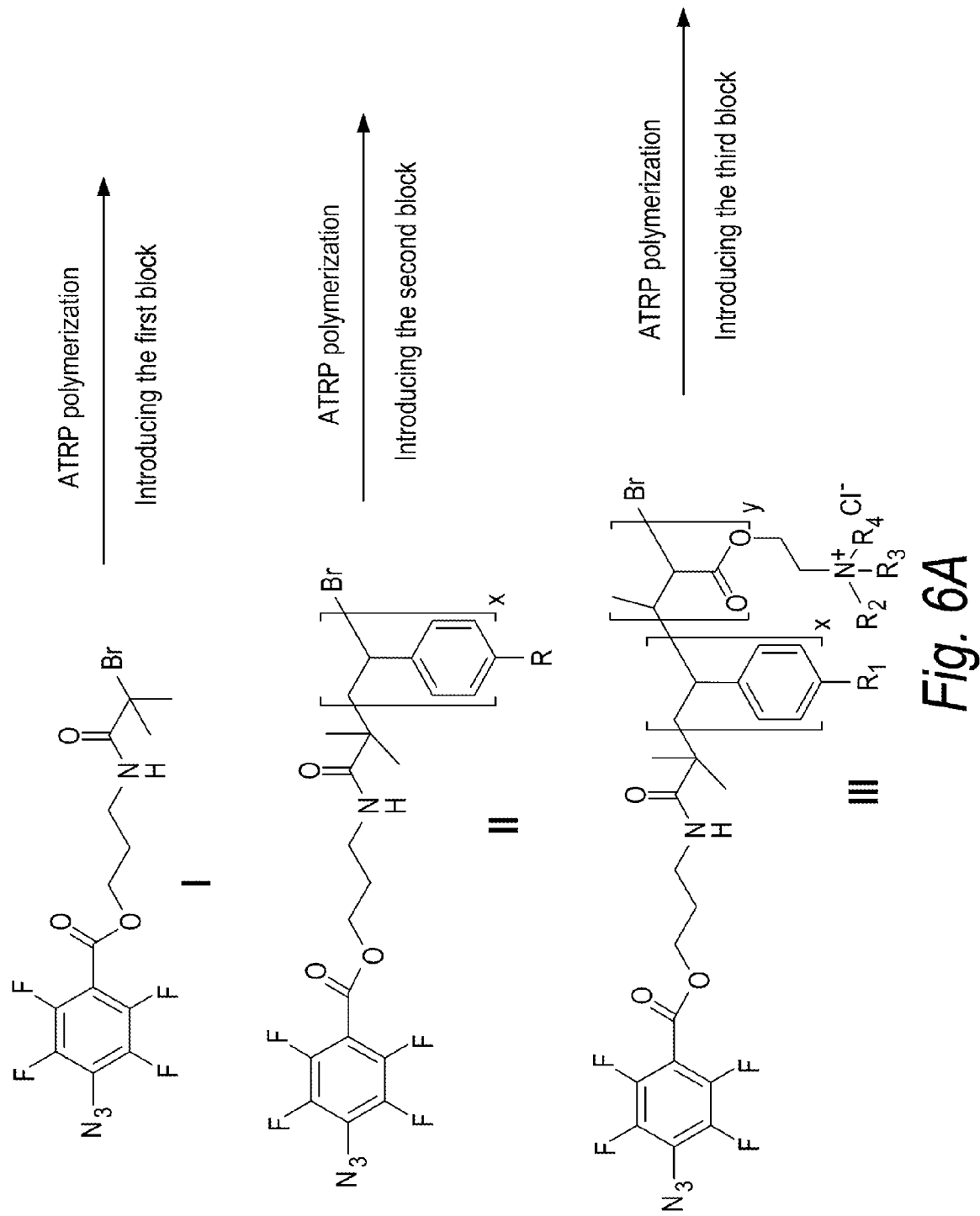
FIGS. 6A-6B depict a specific example of a process for grafting a functionalized tri-block copolymer onto pigment surfaces via azide chemistry, bearing a positive charge.
Figure 6B:
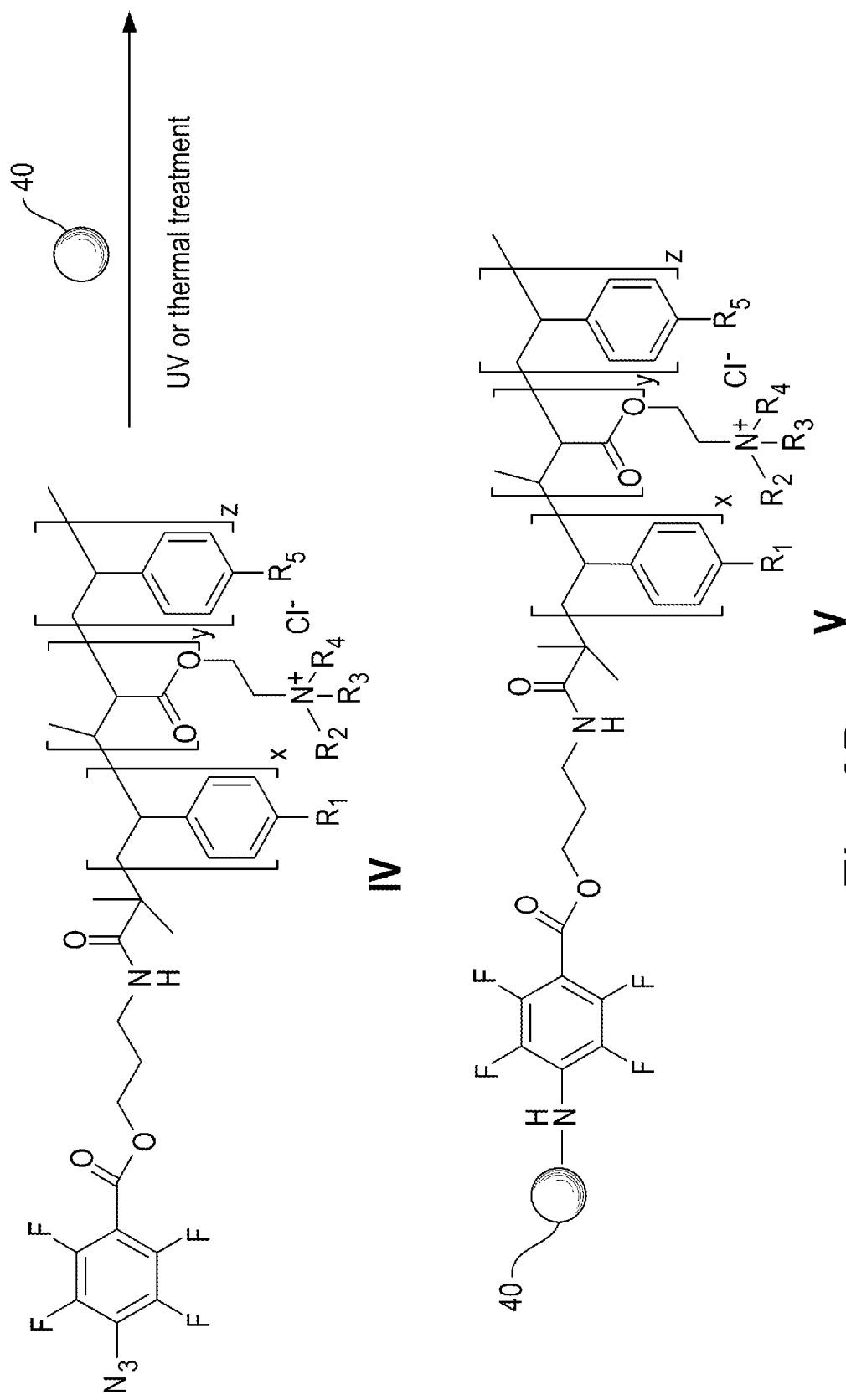

Shown in FIGS. 6A-6B is a specific example of a tri-block copolymer grafted pigment that can bear a positive charge via azide chemistry. The process is split into two figures for clarity. In FIG. 6A, this example employs polyacrylate ammonium salts and polystylene based tri-block co-polymers. Tetrafluorophenyl azide initiator (I) undergoes the first polymerization with the first block monomer, substituted styrenes to give the first block, polystyrene tetrafluorophenyl azide living polymer (II). Living polymer (II) undergoes the second polymerization with the second block monomer, acrylate ammonium salts to give two-block, polystyrene and polyacrylate ammonium salts tetrafluorophenyl living polymer (III). Living polymer (III) undergoes the third polymerization with the third block monomer, substituted styrene to give three-block, polystyrene, polyacrylate ammonium salts and polystyrene tetrafluorophenyl azide polymer (IV) (shown in FIG. 6B). In FIG. 6B, coupling reaction of inorganic or organic pigments with three-block, polystyrene, polyacrylate ammonium salts and polystyrene tetrafluorophenyl azide polymer (IV) upon UV irradiation gives functionalized tri-block copolymers grafted pigment (V). Such tri-block copolymers grafted pigments can be mixed with other surfactants or charge directors to form charged and stable pigment dispersions for electronic ink applications.

In the reaction scheme depicted in FIGS. 6A-6B:
$R_1$ and $R_5$ represent sterically bulky groups, which helps to improve the solubility of the polymer and stabilize the nano-composite material. It could be any alkyl groups, alkoxy groups, branched alkyl groups and branched alkoxy groups.
$R_2$, $R_3$, and $R_4$ represent hydrogen or simple alkyl groups such as methyl, ethyl etc.
The letters x, y and z are an integer between 1 and about 5,000.
The sphere ball 40 represents any possible electrophoretic particles with all possible colors such as RGB or CYM, as well as white or black. It may be a colored pigment or a colored polymeric particle with a particle size ranging from 50 nm to 1 µm.

The reaction schemes depicted in FIGS. 4A-4B, 5A-5B, and 6A-6B are all directed to the ATRP method. However, in the discussion above regarding FIGS. 4A-4B, alternate surface-initiated polymerization methods were described (NMP and RAFT). Such alternate surface-initiated polymerization methods may also be employed in the reaction schemes depicted in FIGS. 5A-5B and 6A-6B.

Turning now to electronic inks that employ the functionalized pigments discussed above, examples of such electronic inks generally include a non-polar carrier fluid (i.e., a fluid having a low dielectric constant k such as, e.g., less than about 20, or, in some cases, less than about 2). Such fluids tend to reduce leakages of electric current when driving the display, as well as increase the electric field present in the fluid. As used herein, the "carrier fluid" is a fluid or medium that fills up a viewing area defined in an electronic ink display and is generally configured as a vehicle to carry colorant particles therein. In response to a sufficient electric potential or field applied to the colorant particles while driving electrodes of the display, the colorant particles tend to move and/or rotate to various spots within the viewing area in order to produce a desired visible effect in the display cell to display an image. The non-polar carrier fluid includes, for example, one or more non-polar carrier fluids selected from hydrocarbons, halogenated or partially halogenated hydrocarbons, and/or siloxanes. Some specific examples of non-polar carrier fluids include perchloroethylene, cyclohexane, dodecane, mineral oil, isoparaffinic fluids, cyclopentasiloxane, cyclohexasiloxane, octamethylcyclosiloxane, and combinations thereof.

The colorant particles are dispersed in the carrier fluid. As used herein, the term "colorant particles" refers to particles that produce a color. Some non-limiting examples of suitable colorant particles include the surface-modified pigment particles described above, which may be dispersible in the non-polar carrier fluid due to the presence of the di-block or tri-block copolymers attached to the pigment surface. However, the total elimination of dispersants, such as those commonly used in dispersing pigment particles in the non-polar carrier fluid, may not be attained. In that case, the electronic ink may include one or more suitable dispersants. Such dispersants include hyperdispersants such as those of the SOLSPERSE® series manufactured by Lubrizol Corp., Wickliffe, Ohio (e.g., SOLSPERSE® 3000, SOLSPERSE® 8000, SOLSPERSE® 9000, SOLSPERSE® 11200, SOLSPERSE® 13840, SOLSPERSE® 16000, SOLSPERSE® 17000, SOLSPERSE®18000, SOLSPERSE® 19000, SOLSPERSE® 21000, and SOLSPERSE® 27000); various dispersants manufactured by BYK-chemie, Gmbh, Germany, (e.g., DISPERBYK® 110, DISPERBYK® 163, DISPERBYK® 170, and DISPERBYK® 180); various dispersants manufactured by Evonik Goldschmidt GMBH LLC, Germany, (e.g., TEGO® 630, TEGO® 650, TEGO® 651, TEGO® 655, TEGO® 685, and TEGO® 1000); and various dispersants manufactured by Sigma-Aldrich, St. Louis, Mo., (e.g., SPAN® 20, SPAN® 60, SPAN® 80, and SPAN® 85).

In some examples, the concentration of pigment in the electronic ink ranges from about 0.5 to 20 percent by weight (wt %). In other examples, the concentration of the pigment ranges from about 1 to 10 wt %. In some examples, the concentration of dispersant in the electronic ink ranges from about 0.5 to 20 percent by weight (wt %). In other examples, the concentration of the dispersant ranges from about 1 to 10 wt %. The carrier fluid makes up the balance of the ink.

There is commonly a charge director employed in electronic inks. As used herein, the term "charge director" refers to a material that, when used, facilitates charging of the colorant particles. In an example, the charge director is basic and reacts with the acid-modified colorant particle to negatively charge the particle. In other words, the charging of the particle is accomplished via an acid-base reaction between the charge director and the acid-modified particle surface. It is to be understood that the charge director may also be used in the electronic ink to prevent undesirable aggregation of the colorant in the carrier fluid. In other cases, the charge director is acidic and reacts with the base-modified colorant particle to positively charge the particle. Again, the charging of the particle is accomplished via an acid-base reaction between the charge director and the base-modified particle surface or adsorption of charged micelles.

The charge director may be selected from small molecules or polymers that are capable of forming reverse micelles in the non-polar carrier fluid. Such charge directors are generally colorless and tend to be dispersible or soluble in the carrier fluid.

In a non-limiting example, the charge director is selected from a neutral and non-dissociable monomer or polymer such as, e.g., a polyisobutylene succinimide amine, which has a molecular structure as follows:

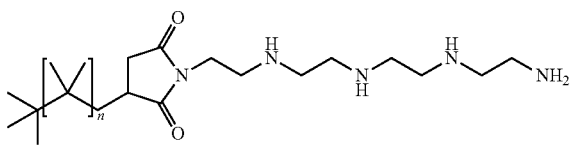

where n is selected from a whole number ranging from 15 to 100.

Another example of the charge director includes an ionizable molecule that is capable of disassociating to form charges. Non-limiting examples of such charge directors include sodium di-2-ethylhexylsulfosuccinate and dioctyl sulfosuccinate. The molecular structure of dioctyl sulfosuccinate is as follows:

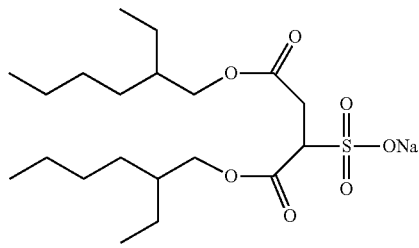

Yet another example of the charge director includes a zwitterion charge director such as, e.g., lecithin. The molecular structure of lecithin is as shown as follows:

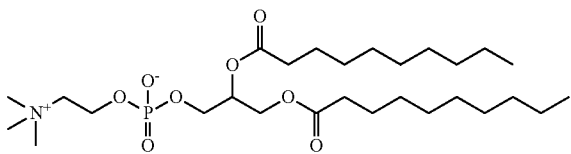 [SMILES: CCCCCCCCCC(=O)OCC(COP(=O)([O-])OCC[N+](C)(C)C)OC(=O)CCCCCCCCC]

The foregoing discussion has been directed to the functionalization of $TiO_2$ pigment particles (white color). However, the teachings herein are equally applicable to other pigments, whether inorganic or organic, and of whatever color. Such inorganic and organic pigments are described further below, along with examples of different colors.

The pigment particles are selected from organic or inorganic pigments, and have an average particle size ranging from about 1 nm to about 10 μm. In some examples, the average particle size ranges from about 10 nm to about 1 μm. In other examples, the average particle size ranges from about 30 to 500 nm. In still other examples, the average particle size ranges from about 50 nm to 1 μm. Such organic or inorganic pigment particles may be selected from black pigment particles, yellow pigment particles, magenta pigment particles, red pigment particles, violet pigments, cyan pigment particles, blue pigment particles, green pigment particles, orange pigment particles, brown pigment particles, and white pigment particles. In some instances, the organic or inorganic pigment particles may include spot-color pigment particles, which are formed from a combination of a predefined ratio of two or more primary color pigment particles. To the extent that the generic pigments on the foregoing list can be functionalized as taught herein, such pigments may be used in the practice of the teachings herein. Likewise, to the extent that the following examples of specific pigments can be functionalized as taught herein, such pigments may be used in the practice of the teachings herein.

A non-limiting example of a suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® L, MONARCH® 700, MONARCH® 800, MONARCH® 880, MONARCH® 900, MONARCH® 1000, MONARCH® 1100, MONARCH® 1300, and MONARCH® 1400); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). A non-limiting example of an organic black pigment includes aniline black, such as C.I. Pigment Black 1.

Other examples of inorganic pigments include metal oxides and ceramics, such as the oxides of iron, zinc, cobalt, manganese, nickel. Non-limiting examples of suitable inorganic pigments include those from the Shephord Color Company (Cincinnati, Ohio) such as Black 10C909A, Black 10P922, Black 1G, Black 20F944, Black 30C933, Black 30C940, Black 30C965, Black 376A, Black 40P925, Black 411A, Black 430, Black 444, Blue 10F545, Blue 10G511, Blue 10G551, Blue 10K525, Blue 10K579, Blue 211, Blue 212, Blue 214, Blue 30C527, Blue 30C588, Blue 30C591, Blue 385, Blue 40P585, Blue 424, Brown 10C873, Brown 10P835, Brown 10P850, Brown 10P857, Brown 157, Brown 20C819, Green 10K637, Green 187 B, Green 223, Green 260, Green 30C612, Green 30C654, Green 30C678, Green 40P601, Green 410, Orange 10P320, StarLight FL 37, StarLight FL105, StarLight FL500, Violet 11, Violet 11C, Violet 92, Yellow 10C112, Yellow 10C242, Yellow 10C272, Yellow 10P110, Yellow 10P225, Yellow 10P270, Yellow 196, Yellow 20P296, Yellow 30C119, Yellow 30C236, Yellow 40P140, Yellow 40P280.

In addition to the foregoing inorganic pigments that may have their surfaces fluorinated as taught herein, the same teachings may be employed with organic pigments. The following is a list of organic pigments that may be treated in accordance with the teachings herein.

Non-limiting examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I.

Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, Pigment Yellow 155, C.I. Pigment Yellow 167, C.I. Pigment Yellow 172, and C.I. Pigment Yellow 180.

Non-limiting examples of suitable magenta or red or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Non-limiting examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Non-limiting examples of green organic pigments include C.I. Pigment Green 1, C.I. Pigment Green2, C.I. Pigment Green, 4, C.I. Pigment Green 7, C.I. Pigment Green 8, C.I. Pigment Green 10, C.I. Pigment Green 36, and C.I. Pigment Green 45.

Non-limiting examples of brown organic pigments include C.I. Pigment Brown 1, C.I. Pigment Brown 5, C.I. Pigment Brown 22, C.I. Pigment Brown 23, C.I. Pigment Brown 25, and C.I. Pigment Brown, C.I. Pigment Brown 41, and C.I. Pigment Brown 42.

Non-limiting examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

Advantageously, the herein-disclosed methods of grafting particles with novel functionalized copolymers (di-block or tri-block) and their dispersion in non-polar solvents results in minimal need for additional surfactants or charge directors. The methods use a step-wise process to two or three different chemically-functionalized polymers which are consecutively grafted onto the particle/polymer surface. Each block of these functionalized tri-block (or di-block) copolymers can be designed to optimize its intended function in the system based on the specific particle chemistry, solvent choice, and system requirement. For example, for the tri-block copolymer, the inner block can be designed to provide the best compatibility to the particle surface chemistry while exhibiting adequate solubility in the non-polar solvent. The middle block can be designed to achieve the appropriate charge functionality in combination with the particle chemistry and other additives. The outer block can be designed to provide adequate steric stabilization to prevent agglomeration based on system requirements. For example, the outer block could be different for the same particle species in a single species ink compared to a dual species/charge system. Using this new technology, one can also make stable dual color electronic inks based on both positively charged particles and negatively charged particles, since the charges are separated by steric stabilizing groups, which prevents the agglomeration and precipitation of the two particle species due to the attraction of opposite charges.

The electronic inks based on such tri-block (or di-block) copolymers grafted onto pigment particles are very stable, since the both the charge-producing and steric stabilization groups are covalently bonded to the pigment surface. This approach contributes to the robustness of the particle. Because there is minimal need to add additional surfactants to stabilize the ink, the final electronic ink will have low background charge, and as a result will exhibit less field screening effects which limit the clearing performance of electronic inks. This surface modification technology can be applied to both organic and inorganic pigments.

The foregoing functionalized pigments have been described with specific application to electronic inks. However, the functionalized pigments may find use in other ink technologies that employ non-aqueous inks. An example of such other ink technology is liquid electrophoretic ink (LEP) used in commercial digital printers.

What is claimed is:
1. Pigment based inks including:
a non-polar carrier fluid; and
a surface-functionalized pigment particle including a nitrogen-linked moiety to the surface of the pigment particle through a nitrogen link at one end of the nitrogen-linked moiety and a block copolymer having at least two blocks attached at another end, the pigment particle suspended in the non-polar carrier fluid.
2. The inks of claim 1 wherein the non-polar carrier fluid is a non-polar solvent selected from the group consisting of hydrocarbons, halogenated hydrocarbons, partially halogenated hydrocarbons, and siloxanes.
3. The inks of claim 2 wherein the non-polar solvent is selected from the group consisting of perchloroethylene, cyclohexane, dodecane, mineral oil, isoparaffinic fluids, cyclopentasiloxane, cyclohexasiloxane, octamethylcyclosiloxane, and combinations thereof.

4. The inks of claim 1 wherein the pigment particle is selected from the group consisting of black pigment particles, yellow pigment particles, magenta pigment particles, red pigment particles, violet pigment particles, cyan pigment particles, blue pigment particles, green pigment particles, orange pigment particles, brown pigment particles, and white pigment particles.

5. The inks of claim 1 wherein the nitrogen-linked moiety includes a tetrafluorophenyl portion.

6. The inks of claim 1 wherein the block copolymer graft comprises two blocks, an inner block that contains either acidic or basic functionalized side groups that facilitate charging of the particle, attached to the nitrogen-linked moiety, and an outer block attached to the inner block that contains bulky organic groups to help facilitate the solubility of such functionalized polymers in the solvent and provide a steric stabilization to the resulting particle dispersion.

7. The inks of claim 6 wherein the inner block is selected from the group consisting of primary amines, secondary amines, tertiary amines, amides, nitriles, isonitriles, cyanates, isocyanates, thiocyanates, isothiocyanates, azides, thiols, thiolates, sulfides, sulfinates, sulfonates, phosphates, hydroxyls, alcoholates, phenolates, carbonyls, carboxylates, phosphines, phosphine oxides, phosphonic acids, phosphoramides, and phosphates and wherein the outer block is selected from the group consisting of alkyl groups, alkoxy groups, branched alkyl groups, branched alkoxy groups and substituted phenyl groups.

8. The inks of claim 1 wherein the block copolymer graft comprises three blocks, an inner block attached to the nitrogen-linked moiety that contains bulky organic groups to help facilitate the solubility of such functionalized polymers in the solvent and provide a steric stabilization to the resulting particle dispersion, a middle block attached to the inner block that contains either acidic or basic functionalized side groups that facilitate charging of the particle, and an outer block attached to the middle block that contains bulky organic groups to help facilitate the solubility of such functionalized polymers in the solvent and provide a steric stabilization to the resulting particle dispersion.

9. The inks of claim 8 wherein the inner block and the outer block are independently selected from the group consisting of alkyl groups, alkoxy groups, branched alkyl groups, branched alkoxy groups and substituted phenyl groups and wherein the middle block is selected from the group consisting of primary amines, secondary amines, tertiary amines, amides, nitriles, isonitriles, cyanates, isocyanates, thiocyanates, isothiocyanates, azides, thiols, thiolates, sulfides, sulfinates, sulfonates, phosphates, hydroxyls, alcoholates, phenolates, carbonyls, carboxylates, phosphines, phosphine oxides, phosphonic acids, phosphoramides, and phosphates.

10. The inks of claim 1 further including a charge director, wherein the charge director is a small molecule or polymer that is capable of forming reverse micelles in the non-polar carrier fluid.

11. In combination, an electronic display and an electronic ink, wherein the electronic display includes:
a first electrode;
a second electrode; and
a display cell having a recess defined by a dielectric material, the first electrode, and the second electrode, the display cell containing the electronic ink; and wherein the electronic ink includes:
a non-polar carrier fluid; and
a surface-functionalized pigment particle including a nitrogen-linked moiety to the surface of the pigment particle through a nitrogen link at one end of the nitrogen-linked moiety and a block copolymer having at least two blocks attached at another end, the pigment particle suspended in the non-polar carrier fluid.

12. The combination of claim 11 wherein the electronic display includes a plurality of display cells in a stacked configuration, associated first electrodes and second electrodes, and a plurality of electronic inks of different colors, each display cell containing an electronic ink of a different color.

13. The combination of claim 11 wherein the non-polar carrier fluid is a non-polar solvent selected from the group consisting of hydrocarbons, halogenated hydrocarbons, partially halogenated hydrocarbons, and siloxanes.

14. The combination of claim 11 wherein the colored pigment is a colored polymeric particle having a size ranging from 1 nm to 10 μm and is selected from the group consisting of black pigment particles, yellow pigment particles, magenta pigment particles, red pigment particles, violet pigment particles, cyan pigment particles, blue pigment particles, green pigment particles, orange pigment particles, brown pigment particles, and white pigment particles.

15. The combination of claim 11 wherein the nitrogen-linked moiety includes a tetrafluorophenyl portion.

16. The combination of claim 11 wherein the block copolymer graft comprises two blocks, an inner block attached to the nitrogen-linked moiety that contains either acidic or basic functionalized side groups that facilitate charging of the particle and an outer block attached to the inner block that contains bulky organic groups to help facilitate the solubility of such functionalized polymers in the solvent and provide a steric stabilization to the resulting particle dispersion, wherein the inner block is selected from the group consisting of primary amines, secondary amines, tertiary amines, amides, nitriles, isonitriles, cyanates, isocyanates, thiocyanates, isothiocyanates, azides, thiols, thiolates, sulfides, sulfinates, sulfonates, phosphates, hydroxyls, alcoholates, phenolates, carbonyls, carboxylates, phosphines, phosphine oxides, phosphonic acids, phosphoramides, and phosphates and wherein the outer block is selected from the group consisting of alkyl groups, alkoxy groups, branched alkyl groups, branched alkoxy groups and substituted phenyl groups.

17. The combination of claim 11 wherein the block copolymer graft comprises three blocks, an inner block attached to the nitrogen-linked moiety that contains bulky organic groups to help facilitate the solubility of such functionalized polymers in the solvent and provide a steric stabilization to the resulting particle dispersion, a middle block attached to the inner block that contains either acidic or basic functionalized side groups that facilitate charging of the particle, and an outer block attached to the middle block that contains bulky organic groups to help facilitate the solubility of such functionalized polymers in the solvent and provide a steric stabilization to the resulting particle dispersion, wherein the inner block and the outer block are independently selected from the group consisting of alkyl groups, alkoxy groups, branched alkyl groups, branched alkoxy groups and substituted phenyl groups and wherein the middle block is selected from the group consisting of primary amines, secondary amines, tertiary amines, amides, nitriles, isonitriles, cyanates, isocyanates, thiocyanates, isothiocyanates, azides, thiols, thiolates, sulfides, sulfinates, sulfonates, phosphates, hydroxyls, alcoholates, phenolates, carbonyls, carboxylates, phosphines, phosphine oxides, phosphonic acids, phosphoramides, and phosphates.

18. The combination of claim 11 further including a charge director, wherein the charge director is a small molecule or polymer that is capable of forming reverse micelles in the non-polar carrier fluid.

19. A method for making a nitrogen-linked surface functionalized pigment particle including:
   providing an azide;
   causing the azide initiator to initiate polymerization of a first block monomer to give a first block azide living polymer;
   adding a second monomer to the first block living polymer to give a two-block azide living polymer;
   causing an inorganic or organic pigment to undergo a coupling reaction with the azide on the two-block living polymer to form a functionalized di-block copolymer grafted pigment through a nitrogen link.

20. The method of claim 19 further comprising adding a third monomer to the two-block living azide polymer, which yields a three-block azide living polymer and causing the inorganic or organic pigment to undergo a coupling reaction with the azide on the three-block living polymer to form a functionalized tri-block copolymer grafted pigment through a nitrogen link.

* * * * *